United States Patent [19]
Leone et al.

[11] Patent Number: 5,369,542
[45] Date of Patent: Nov. 29, 1994

[54] DUAL TRIP CIRCUIT FOR CIRCUIT BREAKER

[75] Inventors: David A. Leone, Lawrenceville; William A. King, Lithonia, both of Ga.

[73] Assignee: Siemens Energy & Automation, Inc., Alpharetta, Ga.

[21] Appl. No.: 848,669

[22] Filed: Mar. 6, 1992

[51] Int. Cl.⁵ .................................. H02H 3/08
[52] U.S. Cl. ............................................ 361/94
[58] Field of Search ............... 361/97, 94, 56, 98, 361/154, 152, 187; 323/223, 226; 335/177, 179

[56] References Cited

U.S. PATENT DOCUMENTS 4,689,712 8/1987 Demeyer .......................... 361/96
4,884,164 11/1989 Dziura et al. ................... 361/97

Primary Examiner—A. D. Pellinen
Assistant Examiner—Sally C. Medley
Attorney, Agent, or Firm—Donald M. Boles

[57] ABSTRACT

A trip circuit for tripping a circuit breaker has a first coil having a relatively large number of turns and therefore a relatively slow reaction time and a second coil having a relatively small number of turns and therefore a relatively fast reaction time. The first coil is responsive to a relatively low current level through a circuit breaker for tripping the circuit breaker at the rated tripping current. The second coil is responsive to a higher current through the circuit breaker for tripping the circuit breaker with great rapidity in case the higher level is reached before the first coil has an opportunity to react.

16 Claims, 2 Drawing Sheets

DUAL TRIP CIRCUIT FOR CIRCUIT BREAKER

BACKGROUND OF THE INVENTION

1. Field of the Invention

This invention relates to trip circuits and more particularly to a novel and highly effective trip circuit having a first portion with a normal, relatively slow reaction time for opening a protected circuit in response to detection of the rated trip current level in the protected circuit and also having a second portion with a very fast reaction time for opening the protected circuit very quickly in case the current level in the protected circuit reaches a dangerously high level before the first portion can react.

2. Description of the Prior Art

Devices for protecting against overload of a circuit have been known virtually as long as electric circuited themselves. The earliest and simplest such devices are fuses that break down, as by melting, in response to a current level above some rated level, called the trip level, which is judged to be the highest current level that the protected circuit can safely handle. Fuses operate reliably enough for many applications but always irreversibly. That is, once a fuse has "blown" it cannot thereafter pass a current and must be replaced in order to restore the protected circuit to operation. The replacement process is normally a manual one and therefore relatively slow, labor-intensive and expensive.

Circuit breakers are an improvement on fuses in several respects. A major advantage of circuit breakers is that they operate reversibly and can be reset (manually in some cases and automatically in other cases) without being physically replaced.

However, even the best modern circuit breakers fail to operate ideally under certain circumstances. In particular, there is a tradeoff between the sensitivity of a trip circuit and its reaction time. Thus the lower the current level at which the circuit breaker is intended to operate, the more sensitive the trip circuit for tripping the circuit breaker must be and therefore, other factors being constant, the slower its reaction time will be. For example, a typical trip circuit for a circuit breaker designed to operate at a current of 100 amps may include a coil having on the order of 13,000 or 14,000 turns and a reaction time on the order of 10 milliseconds. The coil is actually connected to a separate power supply of about 7.5 amps max at 60 volts max and to a normally open switch such as a silicon-controlled rectifier gated by a microprocessor. In a typical industrial installation, the microprocessor may be connected to one or more of three secondary transformer coils of a three-phase main power supply for, say, a factory. The circuit breaker is normally connected in the primary side of the main power supply so that when it is tripped it shuts off all three of the secondary coils.

The large number of turns in the coil mentioned above (13,000 or 14,000) is necessary in order to give the trip circuit enough sensitivity to perform its function. However, the large number of turns corresponds to an increase in the inductance of the coil, which increases the amount of energy required to activate the coil and increases the amount of time required for the activation. The problem that sometimes arises is that, before the coil can react to trip the circuit breaker, the current through the circuit breaker continues to build to a dangerously high level. For example, a circuit breaker that should trip at 100 amps may fail to trip before a current of thousands of amps begins to flow through the circuit breaker, No adequate remedy for this problem exists in the prior art.

OBJECTS AND SUMMARY OF THE INVENTION

An object of the invention is to remedy the problems of the prior art outlined above. In particular, an object of the invention is to provide a trip circuit for tripping a circuit breaker that has enough sensitivity to cause the circuit breaker to trip at a relatively low current (the intended trip level) but that can also react quickly enough to trip the circuit breaker virtually instantaneously at some higher level if the sensitive part thereof cannot react quickly enough.

The foregoing and other objects are attained in accordance with the invention by providing a trip circuit for tripping a circuit breaker, the trip circuit comprising: first trip means having a first reaction time and being responsive to a first current level through a circuit breaker for tripping the circuit breaker; and second trip means having a second reaction time and being responsive to a second current level through the circuit breaker for tripping the circuit breaker; wherein: the second current level is higher than the first current level and the second reaction time is faster than the first reaction time.

The first trip means preferably comprises a first coil having a first number of turns and the second trip means comprises a second coil having a second number of turns, the first number of turns being greater than the second number of turns. This enables the first coil to cause tripping of the circuit breaker at a relatively low current level and enables the second coil to trip the circuit breaker with great rapidity in case a dangerously high level is reached before the first coil has an opportunity to react.

BRIEF DESCRIPTION OF THE DRAWINGS

A better understanding of the objects, features and advantages of the invention can be gained from the following detailed description of the preferred embodiment thereof, in conjunction with the appended figures of the drawing, wherein a given reference character always designates the same element or part, and wherein.

DESCRIPTION OF THE PREFERRED EMBODIMENTS

Figure 1:
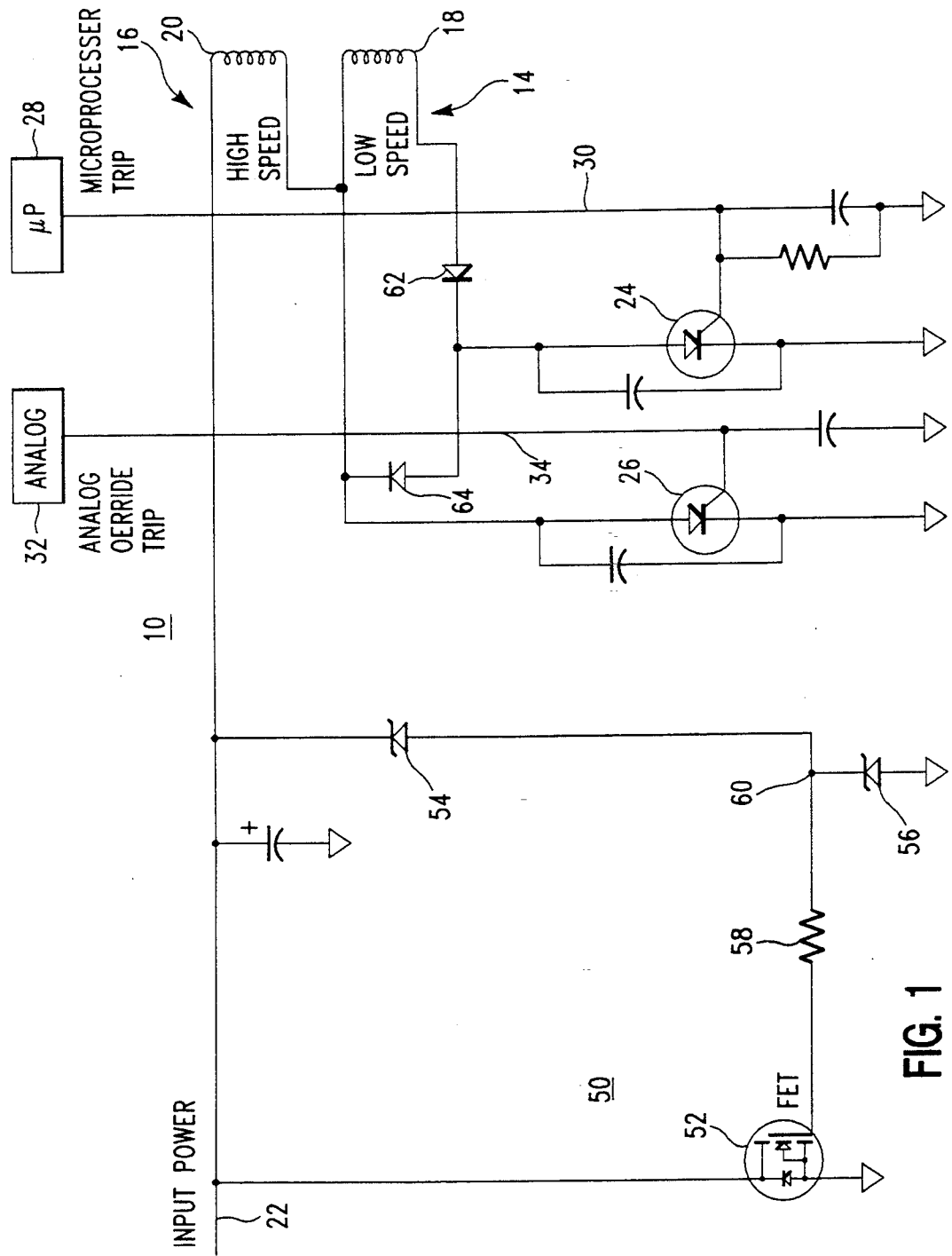
FIG. 1 is a schematic diagram of a preferred embodiment of a trip circuit constructed in accordance with the invention and showing high-speed and low-speed coils employed in the trip circuit.

FIG. 1 shows a trip circuit 10 constructed in accordance with the invention. The trip circuit 10 is effective to trip a circuit breaker 12 having current transformers 13 coupled to a rectifier and multiplexer circuit 13A for sensing current carried by the circuit breaker. Trip circuit 10 and comprises first trip means 14 having a first reaction time and being responsive to a first current level through the circuit breaker 12 for tripping the circuit breaker 12 and second trip means 16 having a second reaction time and being responsive to a second current level through the circuit breaker 12 for tripping the circuit breaker 12. The second current level is higher than the first current level, and the second reaction time is faster than the first reaction time.

As FIG. 1 shows, the first trip means 14 comprises a first coil 18 having a first number of turns, and the second trip means 16 comprises a second coil 20 having a second number of turns. The first number of turns is greater than the second number of turns. For example, as FIG. 1 indicates, the coil 18 may have 13,650 turns, and the coil 20 may have 340 turns. The coil 18 is correspondingly a 1.1K ohms coil, while the coil 20 is a 7.5 ohms coil.

Since the coil 18 has a relatively large number of turns, it will respond to a lower signal than the coil 20, which has a smaller number of turns. On the other hand, the coil 18, having a larger number of turns, requires more energy to actuate it than does the coil 20. That is because of the relatively high inductance associated with a relatively large number of turns. While the coil 18 is in this sense more sensitive than the coil 20, its reaction time is slower by a factor of about 10.

Input power is supplied on a plus rail 22 to the high-speed coil 20 and the low-speed coil 18. The low-speed coil 18 is connected to a first normally open switch 24. The first normally opened switch 24 is adapted to close upon receipt of a proper gating signal and connect the first coil 18 to ground in response to the first current level through the circuit breaker 12.

The second trip means 16 further comprises a second normally open switch 26 connected to the high-speed coil 20. The switch 26 is adapted to close upon receipt of a proper gating signal, thereby connecting the second or high-speed coil 20 to ground in response to the second current level through the circuit breaker 12.

The first normally open switch 24 preferably comprises a first silicon-controlled rectifier, while the second normally open switch 26 comprises a second silicon-controlled rectifier.

Current-measuring means including the current transformers 13, rectifier/multiplexer circuit 13A, and analog/digital converter 13B which is coupled by bus 13C to a microprocessor 28, is responsive to the first current level for gating the first silicon-controlled rectifier 24 through a gating signal on a line 30. When gated, the SCR 24 changes to a closed condition thereby connecting the low-speed coil 18 to ground.

Second current-measuring means exemplified by an analog override trip 32, coupled to the current transformers 13 and rectifier/multiplexer circuit 13A, is responsive to the second current level for gating the second SCR 26 to a closed condition. In the closed condition, the SCR 26 connects the high-speed coil 20 to ground. The gating is through line 34.

The microprocessor 28 can be any conventional microprocessor connected to sense the current through the circuit breaker 12. An example of this sensing capability is disclosed in a patent to Alexander, King and May U.S. Pat. No. 4,631,625, assigned to the assignee of the present application. This patent is incorporated herein by reference.

The analog trip 32 is likewise conventional and can comprise, for example, an operational amplifier having a reference voltage supplied to its negative input terminal and a signal proportional to the current through the circuit breaker supplied to its positive input terminal. When the signal applied to the positive input terminal exceeds the signal applied to the negative input terminal, the gating output on the line 34 is produced, thereby closing the SCR 36 and connecting the high-speed coil 20 to ground.

Figure 2:
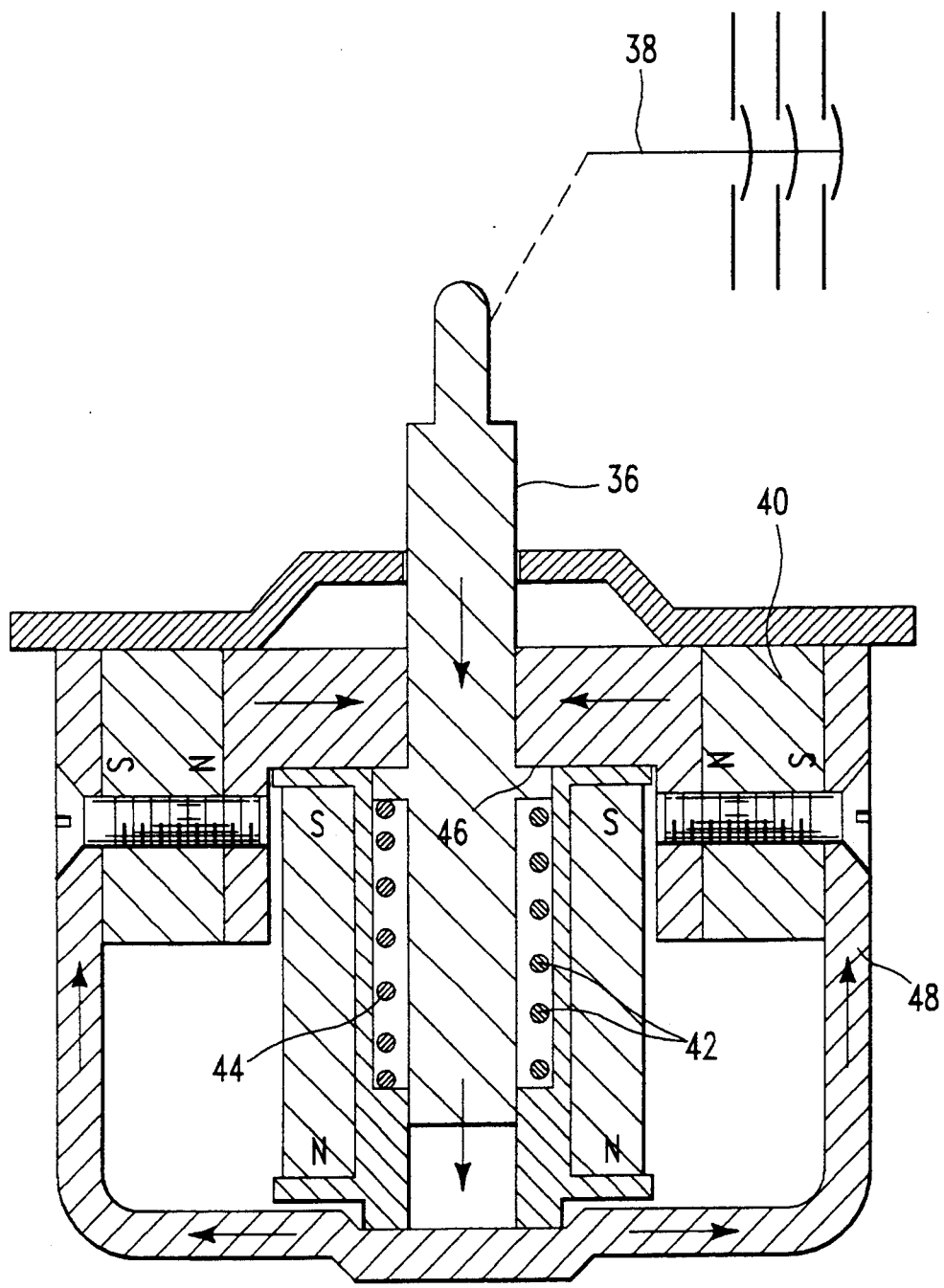
FIG. 2 is a view in axial section showing the deployment of the high-speed and low-speed coils in an actuator responsive to the trip circuit.

FIG. 2 electromagnetic solenoid 35 wherein shows the coils 18 and 20 are mounted concentrically with an actuator 36 mechanically connected as indicted schematically by a line 38 to the circuit breaker 12. The actuator 36 is ferromagnetic and responds to the magnetic field generated by the coils 18 and 20. Surrounding the actuator 36 is a permanent magnet 40, which may be a continuous annular magnet or a plurality of discrete magnets.

A spring 42 is shown in its expanded (actuated) condition in FIG. 2. The actuator 36 is moved upward until a shoulder 44 abuts an annular edge 46 of a ferromagnetic casing 48 which houses the permanent magnet 40 and the coils 18 and 20 and provides a return path for the magnetic fields generated.

The permanent magnet 40 generates a magnetic field that is strong enough to maintain the actuator 36 in a withdrawn position (not illustrated) allowing the circuit breaker 12 to be in the closed condition. The poles of the permanent magnet 40 are oriented in opposition to the poles of the coils 18 and 20. When either of the coils 18 and 20 is actuated in the manner described above, the field that it generates, being in opposition to the magnetic field of the permanent magnet 40, weakens the resultant magnetic field to such a point that the coil spring 42 is able to expand and force the actuator to the position illustrated in FIG. 2, thereby opening the circuit breaker 12.

As FIG. 1 shows, the power supply represented by the plus rail 22 is connected not only to the high-speed coil 20 and low-speed coil 18 but also to an overload protection circuit 50 for protecting the coils 18 and 20 and associated circuit components against circuit overload. The overload protection circuit comprises a third normally open switch 52 which is adapted to close and connect the power supply 22 to ground in case of a circuit overload. The third normally open switch preferably comprises a field-effect transistor or FT. A pair of zener diodes 54 and 56 are connected between the power supply 22 and ground. The zener diodes 54 and 56 are in series with each other and collectively in parallel with the FET 52. The FET 52 has a gate connected via a gate line 58 to a point or junction 60 between the zener diodes 54 and 56. The zener diodes have breakdown voltages such that the FET 52 closes when the power supply develops a potential exceeding about 60 volts. Diodes 62 and 64 control the direction of current between the coils and their gates, and other circuit components serving conventional purposes are connected as shown in FIG. 1.

In a preferred embodiment of the invention, the circuit breaker 12 may be designed to open at a value of, say, 100 amps. At that value or a somewhat higher value, the circuit breaker is operated satisfactorily by the low-speed coil 18. On the other hand, in case of a high-current fault, the current in the circuit breaker can rapidly rise to thousands of amps and do substantial damage before the coil 18 can react. In that case, the coil 20, having a much smaller number of turns and a much lower inductance, will react and open the circuit breaker 12. For example, the coil 20 may react if the coil in the circuit breaker 20 rises to a value of 1,000 amps or more. Thus in accordance with the best mode now contemplated for practicing the invention, the high-speed coil kicks in at about 10 times the rated value of the circuit breaker. Of course, as those skilled in the art will readily understand, this ratio is not at all critical and can be adjusted depending upon the margin of safety which may be considered appropriate in a given installation.

In the case of the circuit parameters discussed above and illustrated in the drawings, the low-speed coil 18 may have a reaction time of 9 or 10 milliseconds, while the high-speed coil 20 may have a reaction time of about 1 millisecond.

Thus there is provided in accordance with the invention a novel and highly effective trip circuit having a first portion with a normal, relatively slow reaction time for opening a protected circuit in response to detection of the rated trio current level in the protected circuit and also having a second portion with a very fast reaction time for opening the protected circuit very quickly in case the current level in the protected circuit reaches a dangerously high level before the first portion can react. A trip circuit constructed in accordance with the invention thus solves the problems of the prior art outlined above and accomplishes the objects of the invention.

Many modifications of the preferred embodiment of the invention disclosed above will readily occur to those skilled in the art upon consideration of this disclosure. For example, the numbers of coil turns, the kinds of switches employed, the location of the circuit breaker (whether on the primary side or the secondary side of a power supply circuit), the type of actuator employed, and the details of the devices employed for measuring the current through the circuit breaker all can be selected or modified by those skilled in the art in accordance with the principle of the invention as disclosed herein. Accordingly, the invention is not limited except by the appended claims.

We claim:

1. A circuit breaker trip circuit comprising:
   first trip means for tripping a circuit breaker within a first reaction time upon detection of a first current level being carried by the circuit breaker; and
   second trip means for tripping the circuit breaker within a second reaction time which is quicker than the first reaction time, upon detection of a second current level being carried by the circuit breaker, wherein the second current level is greater than the first current level and wherein said first trip means has a first conductive coil, having a first inductance, for carrying a first coil actuation current upon detection of the first current level; and
   said second trip means has a second conductive coil having a second inductance less than the first inductance, for carrying a second coil actuation current upon detection of the second current level;
   and wherein both the first and second conductive coils form electromagnets within an electromagnetic solenoid.

2. A trip circuit according to claim 1, wherein the first trip means comprises a first coil having a first number of turns and the second trip means comprises a second coil having a second number of turns, said first number of turns being greater than said second number of turns.

3. A trip circuit according to claim 1, wherein the first trip means comprises a first normally open switch connected to the first coil, the first normally open switch closing and connecting the first coil to ground in response to detection of said first current level being carried by the circuit breaker and the second trip means comprises a second normally open switch connected to the second coil, the second normally open switch closing and connecting the second coil to ground in response to said detection of said second current level being carried by the circuit breaker.

4. A trip circuit according to claim 3, wherein the first normally open switch comprises a first silicon-controlled rectifier and the second normally open switch comprises a second silicon-controlled rectifier, the first trip means further comprising first current-measuring means responsive to said first current level for gating the first silicon-controlled rectifier to a closed condition and the Second trip means further comprising second current-measuring means, responsive to said second current level, for gating the second silicon-controlled rectifier to a closed condition.

5. A trip circuit according to claim 4, wherein the first current-measuring means includes a microprocessor for comparing a current value being carried by the circuit breaker with the first current level and the second current-measuring means includes an operational amplifier for comparing the current value being carried by the circuit breaker with the second current value.

6. A trip circuit according to claim 3, further comprising a power supply for supplying power to the first and second trip means and an overload protection circuit connected to the power supply for protecting the first and second trip means against circuit overload.

7. A trip circuit according to claim 6, wherein said overload protection circuit comprises a third normally open switch, the third normally open switch closing and connecting the power supply to ground in case of a circuit overload.

8. A trip circuit according to claim 7, wherein said third normally open switch comprises a field-effect transistor.

9. A trip circuit according to claim 8, further comprising a pair of zener diodes connected between the power supply and ground, the zener diodes being in series with each other and collectively in parallel with the field-effect transistor and said field-effect transistor having a gate connected to a point between said zener diodes, the zener diodes having breakdown voltages such that the field-effect transistor closes when said power supply develops a potential exceeding about 60 volts.

10. The trip circuit of claim 1, wherein the electromagnetic solenoid further comprises:
   an actuator movable between a first position which maintains the circuit breaker in a closed, current-carrying status and a second position which opens the circuit breaker;
   a permanent magnet forming a magnetic field having an orientation which biases the actuator into the first position; and
   the first or second conductive coils are oriented with respect to the permanent magnet such that carrying of respective coil actuation current in either of said coils alters the magnetic field of the permanent magnet, so that the actuator moves to its second position.

11. The trip circuit of claim 10, wherein the first conductive coil has a first number of turns and the second conductive coil has a second number of turns less than the first number of turns.

12. The trip circuit of claim 1, wherein the first current level is approximately rated full load current of the circuit breaker and the second current level is greater than rated full load current but less than approximately a multiple of ten times rated full load current.

13. A circuit breaker trip circuit comprising: an electromagnetic solenoid having:
   an actuator movable between a first position which maintains a circuit breaker in a closed, current-carrying status and a second position which opens the circuit breaker;
   a permanent magnet forming a magnetic field having an orientation which biases the actuator into the first position; and
   first and second conductive coils, having first and second inductances, respectively, with the second inductance being less than the first inductance, the coils being oriented with respect to the permanent magnet such that carrying of a respective coil actuation current in either of said coils alters the magnetic field of the permanent magnet, so that the actuator moves to its second position;
   a current transformer for sensing current being carried by a circuit breaker;
   first trip means, coupled to the current transformer and including the first conductive coil, for tripping the circuit breaker within a first reaction time upon detection of a first current level being carried by the circuit breaker by energizing the first conductive coil with coil actuation current; and
   second trip means, coupled to the current transformer and including the second conductive coil, for tripping the circuit breaker within a second reaction time which is quicker than the first reaction time, upon detection of a second current level being carried by the circuit breaker, wherein the second current level is greater than the first current level, by energizing the second conductive coil with coil actuation current.

14. The circuit breaker trip circuit of claim 13, further comprising:
   a coil actuation current source coupled to ground and each of the respective first and second conductive coils;
   wherein the first trip means includes a first normally open switch coupled between the first conductive coil and ground for providing coil actuation current to the first conductive coil by first switch closure upon detection of the first current level by the first trip means; and
   wherein the second trip means includes a second normally open switch coupled between the first conductive coil and ground for providing coil actuation current to the second conductive coil by second switch closure upon detection of the second current level by the second trip means.

15. The circuit breaker trip unit of claim 14, wherein the first and second normally open switches are first and second silicon-controlled rectifiers, respectively, which upon respective closure are gated to conduct coil actuation current between the respective first and second conductive coils upon detection of the respective first and second current levels.

16. The circuit breaker trip unit of claim 14, wherein:
   the first trip means includes a microprocessor coupled to the current transformer for detecting the first current level and closing the first normally open switch upon detection thereof; and
   the second trip means includes an operational amplifier coupled to the current transformer for detecting the second current level and closing the second normally open switch upon detection thereof.

* * * * *